(12) United States Patent
Kulkarni et al.

(10) Patent No.: US 12,543,776 B2
(45) Date of Patent: Feb. 10, 2026

(54) ARTICLE FOR AN AEROSOL GENERATION DEVICE COMPRISING AN INFORMATION CODE

(71) Applicant: JT International SA, Geneva (CH)

(72) Inventors: Pranav Kulkarni, Trier (DE); Patrice Borne, Publier (FR); Aleksandr Kontarev, Trier (DE); Layth Sliman Bouchuiguir, Bellevue (CH)

(73) Assignee: JT International SA (CH)

( * ) Notice: Subject to any disclaimer, the term of this patent is extended or adjusted under 35 U.S.C. 154(b) by 710 days.

(21) Appl. No.: 17/787,774

(22) PCT Filed: Dec. 18, 2020

(86) PCT No.: PCT/EP2020/087096
§ 371 (c)(1),
(2) Date: Jun. 21, 2022

(87) PCT Pub. No.: WO2021/123220
PCT Pub. Date: Jun. 24, 2021

(65) Prior Publication Data
US 2023/0077741 A1  Mar. 16, 2023

(30) Foreign Application Priority Data
Dec. 20, 2019 (EP) .................................. 19218686

(51) Int. Cl.
*G06K 19/06* (2006.01)
*A24D 1/02* (2006.01)
(Continued)

(52) U.S. Cl.
CPC ................. *A24D 1/02* (2013.01); *A24D 1/20* (2020.01); *A24F 40/20* (2020.01); *A24F 40/53* (2020.01); *G06K 19/06131* (2013.01)

(58) Field of Classification Search
CPC .. A24D 1/02; A24D 1/20; A24F 40/53; A24F 40/20; G06K 19/06131
(Continued)

(56) References Cited

U.S. PATENT DOCUMENTS 6,186,405 B1  2/2001  Yoshioka
2013/0312619 A1*  11/2013  Spiegel ............... A47J 31/3676
426/87

(Continued)

FOREIGN PATENT DOCUMENTS

EP    2201850 A1    6/2010
JP    H07-110847 A   4/1995
(Continued)

OTHER PUBLICATIONS

International Search Report for PCT/EP2020/087096 dated Dec. 4, 2021. 3 pgs.

*Primary Examiner* — Daniel A Hess
(74) *Attorney, Agent, or Firm* — Lerner David LLP

(57) ABSTRACT

An article for an aerosol generation device comprising a tobacco material configured to generate an aerosol is disclosed. The article includes a wrapper. The wrapper comprises an information code for storing information on the article. The information code is optically recognizable. The information code includes a code unit having a pattern for storing information on the article. The code unit is repeated on the article. Each code unit comprises a reference element indicating the presence and, preferably, the position of the code units.

22 Claims, 12 Drawing Sheets

Figure 1:
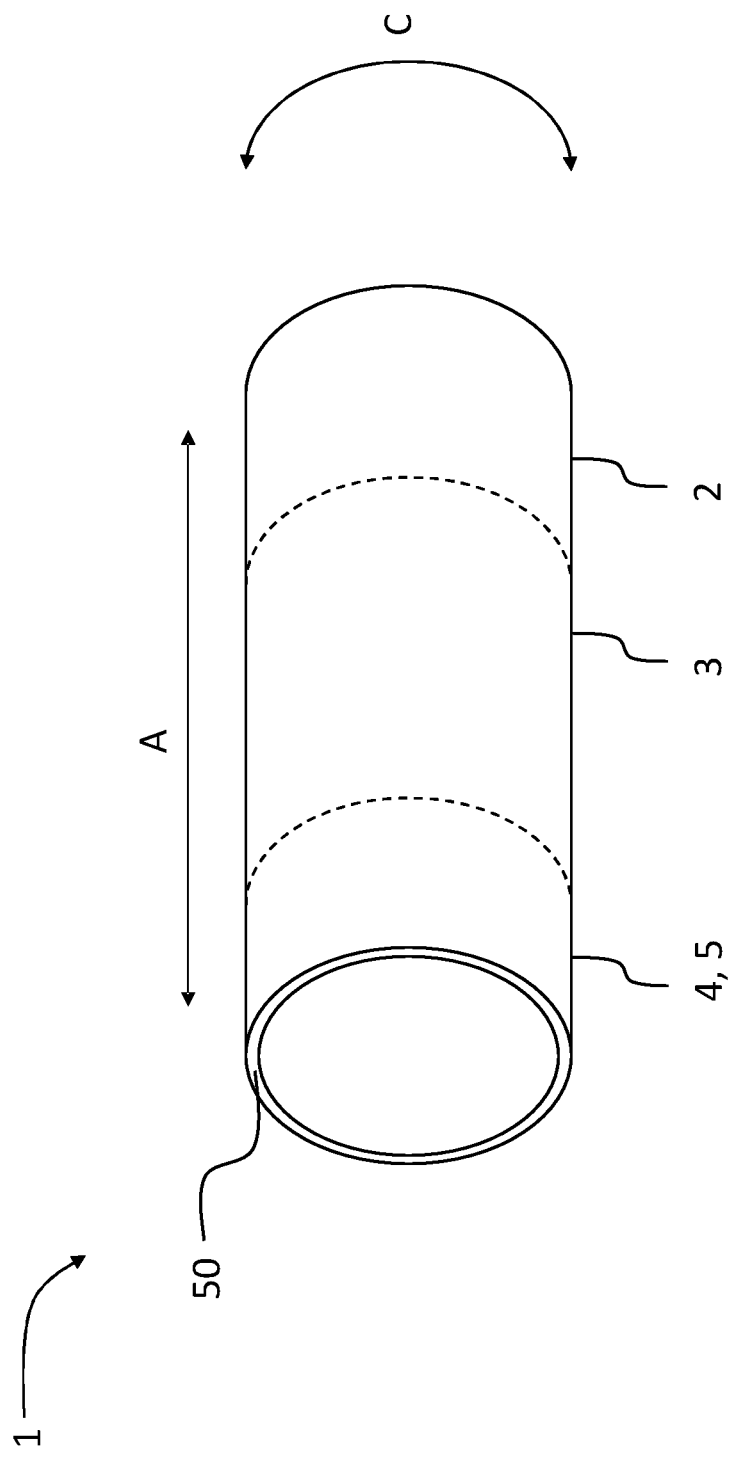

(51) Int. Cl.
*A24D 1/20* (2020.01)
*A24F 40/20* (2020.01)
*A24F 40/53* (2020.01)

(58) Field of Classification Search
USPC .......................................................... 235/494
See application file for complete search history.

(56) References Cited

U.S. PATENT DOCUMENTS

| | | |
|---|---|---|
| 2016/0267369 A1 | 9/2016 | Picard et al. |
| 2018/0049469 A1 | 2/2018 | Kaufman et al. |
| 2019/0050616 A1 | 2/2019 | Noth |
| 2019/0158938 A1 | 5/2019 | Bowen et al. |
| 2019/0223494 A1 | 7/2019 | Knauseder et al. |
| 2020/0305512 A1* | 10/2020 | Lim .................... H05B 1/0297 |

FOREIGN PATENT DOCUMENTS

| | | |
|---|---|---|
| JP | H10-326331 A | 12/1998 |
| JP | 2006-064585 A | 3/2006 |
| JP | 2016-540329 A | 12/2016 |
| JP | 2017-182108 A | 10/2017 |
| JP | 2019-528053 A | 10/2019 |
| WO | 2019129378 A1 | 7/2019 |
| WO | 2019185747 A1 | 10/2019 |

* cited by examiner

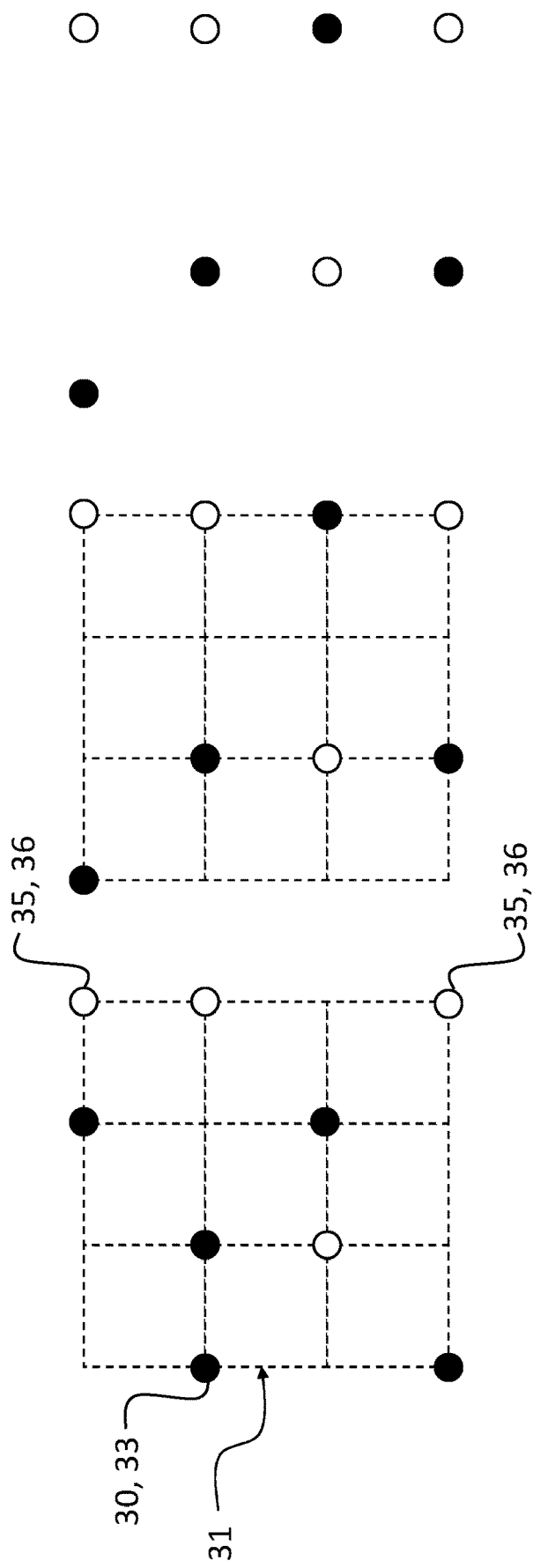

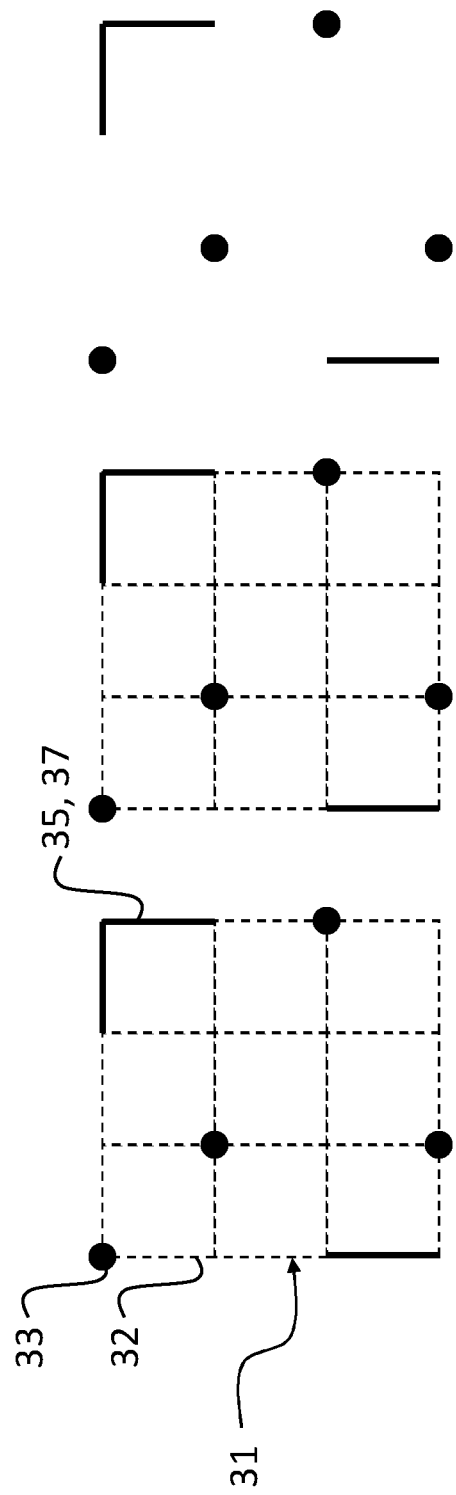

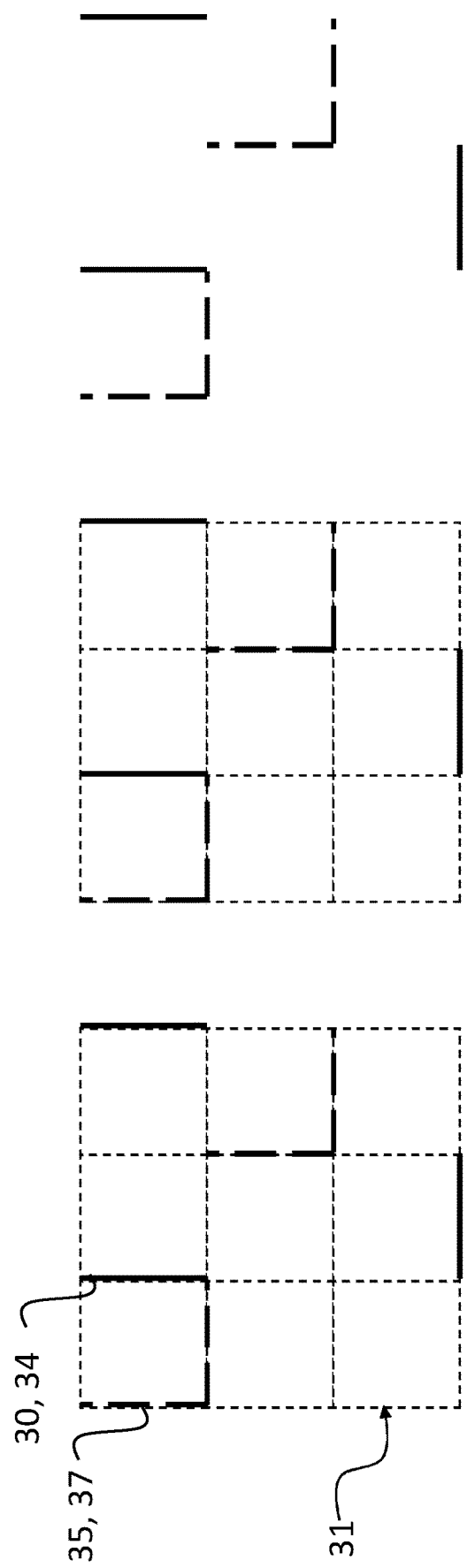

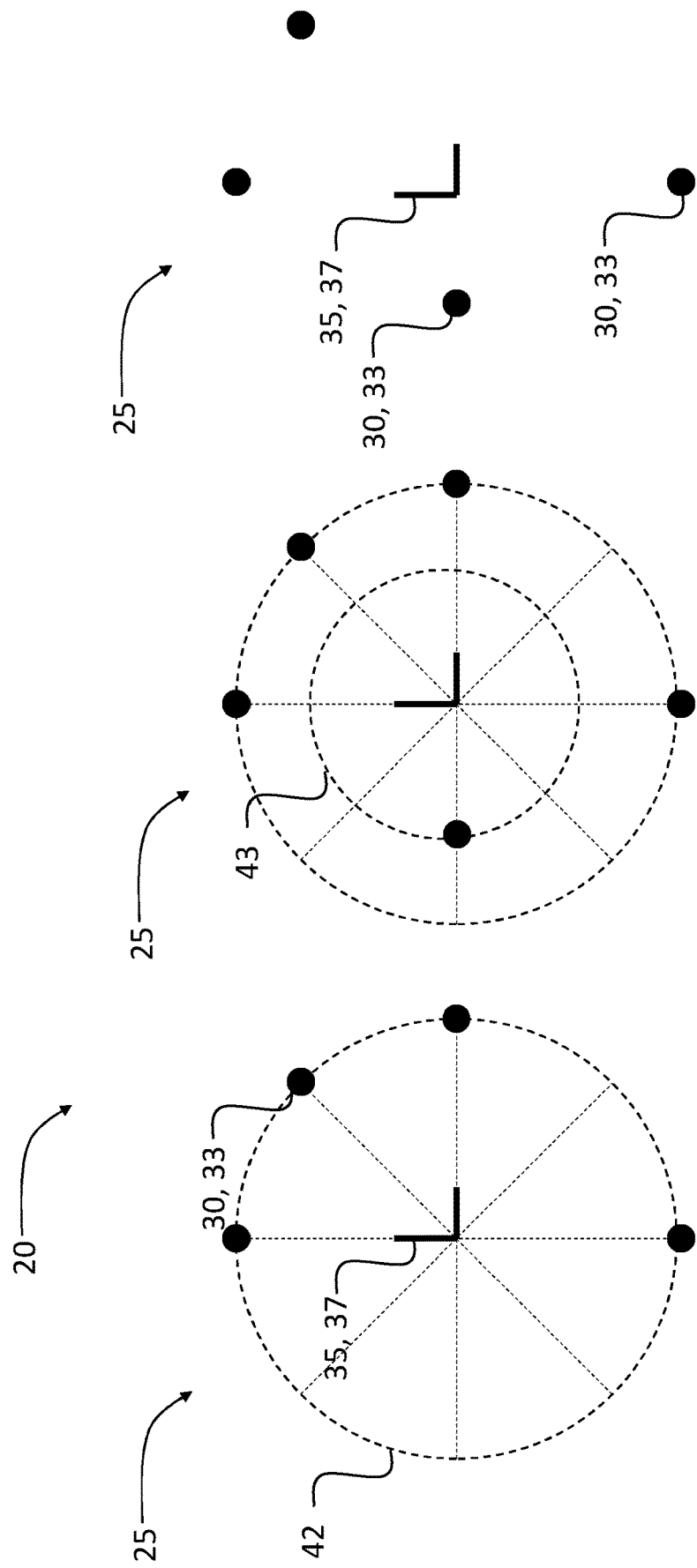

ARTICLE FOR AN AEROSOL GENERATION DEVICE COMPRISING AN INFORMATION CODE

The present application is a national phase entry under 35 U.S.C. § 371 of International Application No. PCT/EP2020/087096, filed on Dec. 18, 2020, published in English, which claims priority from European Application No. 19218686.4, filed on Dec. 20, 2019, the disclosures of which are incorporated herein by reference.

The present invention is directed to an article for an aerosol generation device comprising a tobacco material configured to generate an aerosol.

Aerosol generating devices as such are known in the prior art. One type of aerosol generation devices is heat not burn products. Heat not burn (sometimes abbreviated as "HNB") products heat up tobacco to a temperature of 150 to 350° C. such that an aerosol is generated. Notably, these temperatures are below a temperature at which the tobacco burns. Oftentimes a tobacco portion to be heated and a device for heating the tobacco portions are provided separately such that the consumed tobacco can be replaced while the device comprising electronic components like a heater, a controller and a battery may be re-used. The replaceable tobacco portions may be referred to as an "article". Such as found in cigarettes, there is a variety of blends and flavors in smoking articles that may be used in conjunction with heat not burn devices. Depending to on the blend and the flavor, different parameters or operational settings may be preferable. For example, depending on the blend a different temperature may be appropriate or a different heating profile. Therefore, it has been proposed to provide indicia on articles for aerosol generation such that the device can read out the operational parameters.

WO 2019/185747 A1 provides an example of such indicia. The document discloses optically detectable indicia provided in association with the article and an optical sensor configured to sense the indicia. The indicia are realized as an QR code or a barcode. In some embodiments, the indicia extend all of the way around the perimeter of the article facilitates the sensing of the indicia by the sensor arrangement irrespective of the particular orientation of the article within the apparatus.

WO 2019/129378 A1 shows a further example of such indicia. In WO 2019/129378 A1 the indicia is a code, which is optically readable and has the form of a one-dimensional or two-dimensional barcode. The indicia may be a pattern, which is repeated around the circumference of the consumable so that the optical reader is capable of reading the indicia irrespectively of the orientation of the consumable in the cavity.

Lastly US 2018/0049469 shows a further variation of indicia. In US 2018/0049469 a smoking apparatus that comprises a capacitive sensor is disclosed. The capacitive sensor detects a change in capacitance when an article of a smokable material is inserted. In one embodiment, additionally optical sensing is used. Proposed optical sensing techniques include the use of a detection of barcodes that are linear or two-dimensional in combination with one or more LEDs or a laser.

However, the proposed patterns and optical sensing techniques have the disadvantage, that they are not particularly compact, provide low code density (i.e. limited information coding per surface unit) and are not adapted to the particular geometry and small size of aerosol generation articles. Aerosol generation articles may have a cylindrical or otherwise curved or angled shape which may distort indicia on the article. Hence, the read out of the indicia (i.e. barcodes or QR codes) known in the prior art may be imprecise. Furthermore, the surface area adapted to receive the code is limited whereas there is a need to encode enough information, such as a wide range of values, e.g. for parameter setting and/or authentication purposes.

A first aspect of the invention is directed to an article for an aerosol generation device comprising a tobacco material configured to generate an aerosol. The article includes a wrapper. The wrapper comprises an optically recognizable information code for storing information on the article. The information code includes a code unit with a pattern which codes the information. The code unit is repeated on the article. The code unit may comprise a reference element for indicating the presence and the position of the pattern to an optical reading device configured to detect and read the code pattern.

The code unit may be repeated along the circumference of the wrapper of the article.

The information code may encode parameters such as a temperature profile, vaping times, number of puffs, product data, durations/frequencies of vaping cycles, tobacco blends, expiry date, an identifier or metadata that may direct to a look-up table stored on the device. Further, the information may enable a tracing, an authentication, dates and/or product information (e.g. brand, names, warning messages, etc. for display on a user interface of the aerosol generating device or an associated device such as a smart phone or tablet).

The reference element may allow an optical reading device to deduce the boundaries of a single code unit. This may further allow a detection where a code unit begins or ends. For example, the reference element could be arranged at a center position of the code unit and/or its borders. The reference element may comprise a start section and/or a stop section. This allows a separation of the adjacent code units. The use of a reference element allows a reduction in computing power needed to read out the code unit since the read-out device only needs to scan for the reference element. In a preferred embodiment, the pattern is two-dimensional. This allows a more compact form.

The reference element allows a reading thereof independently of the rotational position of the article when inserted in a heating chamber of a said aerosol generating device, thus making the need for indexing the stick relative to the device 100ot.

The reference element may indicate the geometric (i.e. 2-dimensional) position of the pattern. The reference element may be bi-directional. For example, the reference element may comprise two or more lines (i.e. the lines not being parallel to each other) or at least three dots, wherein the dots are not arranged along single straight line. The position of the pattern may thus be determined in a repeated pattern of several code units more efficiently requiring less computing power.

In certain embodiments, the reference element may be optional.

The code units may be arranged directly adjacent to each other or may be spaced apart. A distance between two code units may be half the width of a code unit or less, preferably a third of the width (i.e. circumferential extension) of a code unit.

Preferably, a code unit has a maximal dimension (e.g. a length or diameter) of less than 4 mm, preferably less than 3 mm, further preferred less than 2 mm, 1 mm or 0.3 mm. The maximal dimension may be less than 0.3 mm or 0.2 mm. The maximal dimension may also be about 0.3 to 4 mm, preferably of from about 0.5 to 2 mm. A benefit of the reduced size is that it can provide enough repetitions in the limited available space. Another benefit is that the image of the code can be captured with a miniaturized detecting device, for instance with an image sensor of a few millimeters.

The code units may be arranged without gaps and/or overlaps between adjacent code units. The code units of the information code may be arranged in a tessellating shape. This allows a compact arrangement of the plurality of codes units on the wrapper and allows for more code units repetitions, e.g. along the circumferential direction, e.g.: for read error checking. Further, the design of robust code decoding algorithms able to correct code reading and/or decoding errors using several codes encoding the same information is enabled. Thus, the code reading failure rate is minimized.

Aerosol generation may in the context of the present invention refer to an aerosol generated from heating of a heat-not-burn article, vaporization of a liquid precursor or any other generation of an aerosol. In a preferred embodiment, the reference element includes a picture, dots, lines or any combination thereof. Using dots as a reference element provides the advantage, that they are relatively small and may be barely visible for the consumer. A possible reference may be formed by a plurality dots positioned in a non-linear fashion to enable to indicate the orientation of the code.

Using dots as coding information, such as a matrix of dots or other bidirectional arrangement (e.g. a polar arrangement), provides high coding density on a limited available space thereby providing the possibility to encode a high number of parameters and values and/or to code many repeated patterns for increasing reading reliability.

The dots forming the code can be arranged on the wrapper with simpler techniques as compared to other forms. Further, dots are less prone to distortion due to the curved surface of a smoking article. The dots may have length and/or width of less than 250 µm, preferably less than 150 µm, more preferably less than 80 µm or less than 60 µm, and most preferably less than 40 µm. The dots are preferably greater than 30 µm, more preferably greater than 40 µm. The dots may be realized as ink printed on a paper (i.e. the wrapper). The dots are preferably circular but may have any shape, i.e. rectangular, squared, or triangles. Similarly, the lines and the pictures may be realized by the before mentioned techniques. Using such dots for the reference elements has the advantage of a resulting code unit (one matrix) being very small. This allows additional repetitions of the code unit on the wrapper around the circumference. In particular, this may allow code units having width of 4 mm, 3 mm, 2 mm or less such that the code unit can be repeated multiple times (e.g. 6 or more times on article with a circumference of 22 to 24 mm). Similarly, other geometric elements like lines with the above dimensions might be used. To ensure that the code unit remain small enough, the dots used as reference and those used for encoding the information may be maintained within a small range of size. However, they can possibly be of different sizes or shapes to be able to be pixelated into different sizes or shapes by the detection unit.

Using a picture as a reference element on the other hand provides the advantage, that a manufacturer could quickly verify the presence of the code unit, e.g. in quality control. Complex pictures can also be reliably recognized by the device for authentication using image recognition, machine learning or other AI techniques. Using the two or more lines may be particularly advantageous to delimit the area of the code unit and also enable a manual read-out. The picture may be partially transparent, i.e. have a transparency of about 50% or less. The picture may include logos and drawings.

In a preferred embodiment, the reference element includes two or more lines. The two or more lines form at least a part of the border for code units. Thereby, a read-out may consume less computing power.

In a preferred embodiment, the reference element is at least partially superimposed by the code unit. The reference element may be within the code unit, i.e. be fully superimposed. In particular, the pattern of the code unit may be comprised of different geometrical elements than the reference element(s). For example, the reference elements may be formed by lines and the pattern including the information may be formed by dots or vice versa. Thereby, reference elements and pattern can be separated, while at the same time reducing a space consumption.

In an embodiment, considering a substantially rod- or pod-shaped article, the code unit is repeated along a circumferential direction of the article. A repetition along the circumferential direction enables an optical reading device arranged to read out the information in the pattern irrespectively of the rotational position of a cylindrical article when inserted in an aerosol generating device comprising said optical reading device. Further, the article may be suitable for aerosol generating devices with different aerosol generation chambers, in particular heating chambers, wherein or whereat an optical reading device can be arranged to detect and read the code pattern.

The substantially rod- or pod-shaped article may have a circumference of 50 mm, 40 mm, 30 mm, 25 mm, 24 mm, 23 mm, 22 mm, 21 mm, 20 mm, 19 mm, 18 mm, 17 mm, 16 mm or less.

In a preferred embodiment, the pattern represents a binary code. In a further preferred embodiment, the pattern includes individual elements, an element in particular being a dot and/or a line, that are positioned in predetermined positions of the pattern, wherein the presence or absence of an individual element on a predetermined position represents binary information. Thereby a binary (digital) encoding is provided. For example, the predetermined positions may be arranged along a grid, in particular at intersections of grid lines. In case a dot is arranged on at an intersection of a grid the information "1" is conveyed (alternatively "0") and in case no dot is arranged on a corner the information "0" may be conveyed (alternatively "1").

Adjacent intersections along a grid line with crossing grid lines may be separated by 1 mm, 0.8 mm, 0.6 mm, 0.5 mm, 0.4 mm, 0.25 mm, 0.15 mm or less. This leads to compact patterns with a high information density and increases the number of code units that can be arranged within the reading area of the reading device.

The pattern may include an analog code. The analog code may represent a continuous variable. In a preferred embodiment, the pattern includes one or more individual elements, an element in particular being a dot and/or a line, the one or more individual elements being positioned along a predetermined range or in a predetermined area, wherein the position of an individual element along the range or in the area represents information. More particularly, a distance between one or more individual elements and a reference can be determined within the predetermined range or area. Thereby, analog information may be conveyed. For example, a distance between a dot and a line may indicate a suitable temperature for the heater. Therefore, a high number of values can be encoded on a reduced surface area.

The analog value may also be converted into another value using mathematical functions such as linear, logarithmic, exponential or any others.

In a preferred embodiment, the individual elements are arranged according to a grid. The grid is preferably regular. For example, the grid may be a square grid, e.g. a 3×3 grid with 4 parallel horizontal and four parallel vertical grid lines. Other grid sizes, i.e. 4×4, 5×5, 6×6 may be suitable. Also, the grid may be rectangular (e.g. 3×4, 6×3, etc.). The grid may also have any polygonal contour geometrically divided by interior crossing lines, such as a triangle, pentagon, octagon, hexagon, lozenge, etc. The line may be arranged between intersections of the grid lines and/or the dots may be arranged at intersections of the grid lines. It should be noted that though the grid can be realized on the wrapper, the grid does not need to be printed or otherwise shown explicitly on the article. Rather the grid may be a structure according to which the elements are arranged on the wrapper. The grid may be formed of abscise and ordinate lines crossing at 90° or can have any other shape such a grid formed of a plurality of concentrically arranged circles crossed by a plurality of radial lines. In a further embodiment, the predetermined positions of the individual elements are arranged along a band.

In an embodiment, the reference elements have a first color and the pattern has a second color. The second color is different from the first color. Thereby, during readout, the reference elements can be detected more readily. Further, the code unit may be more compact or contain more information, since the pattern and the reference elements can overlap without interfering.

In a preferred embodiment, the predetermined positions of the dots and/or lines are arranged along a circumference of a circle or several concentrically arranged circles. The presence of elements at the intersections of the circle or circles and radial lines is indicative of a binary value ("0" or "1"). Alternatively, or additionally, the circle or circles may form together with a reference, a polar coordinate system for the positioning of one or more elements, such that the angular distance of one or more elements on a circle from a reference, such as a radial line, dot or other, provides an analog code which can representative of a parameter value.

In a preferred embodiment, the code unit is repeated along the circumference. The article may comprise at least one circumferential area comprising a plurality of code units repeated along a corresponding circumferential direction and at least one code unit being may be present on every angular segment of less than 90 degrees, preferably less than 60 degrees, more preferably less than 45 degrees, most preferably less than 40 degrees. Thereby, at least 4, 6, 8 or 9 code units can be arranged on the circumference. Preferably, the angular segments are 36, 22.5, or less degrees. This allows 10, 16 or more code units on the circumference of the circle.

Having smaller circumferential areas allows reading devices with a smaller detection area and thus for smaller reading devices. For example, a camera having dimensions in the magnitude of a few millimeters might be used. This size provides for an easy and reliable integration in an aerosol generation device.

In a preferred embodiment, the wrapper comprising the information code is arranged an exterior surface of the article.

In a preferred embodiment, the article comprises an outer wrapper covering the wrapper having the information code at least partially and wherein the outer wrapper is at least partially transparent or translucent such that the information code can be read. Thereby, the information code is protected from wear and tear during handling of the article, for example during production, transportation or storage.

In a preferred embodiment, the individual elements (i.e. the elements of the pattern or the reference) of the information code have a size of less than 100 μm, in particular between 1 and 60 μm. In a preferred embodiment, individual elements are formed by ink.

In a preferred embodiment, the article is rod-shaped and comprises, preferably along an axial direction, a first part and a second part. The first part may not comprise the tobacco material and the information code is located on the first part. Alternatively, the information code is located on the second part. The first part may comprise a mouthpiece, a filter or hollow tube for drawing an aerosol generated upon heating of the tobacco material comprised in the second part.

Arranging the information code on the first part has the advantage, that the information code may be visible and readable by an optical reading device during use of the article inserted in an aerosol generating chamber of a device. Further, a location of code remote from a heated zone preserves the code unit from heat perturbation during reading and improves the lifetime of a dedicated optical reading device arranged in the device. Additionally, the code may not get damaged during insertion into the aerosol generating chamber.

Arranging the information code on the second part may allow for devices that have a more compact form, since the optical reading system can be at an interior portion of the device.

A second aspect of the invention relates to a method for reading a pattern comprised by a code unit of an information code comprised by the article as described above. The method comprises the steps of detecting, with an optical reading device, the reference element of the code unit, determining the presence of the pattern by means of the reference element, and reading the pattern.

The method may comprise a step of detecting more than one code unit by the optical reading system and comparing the code units by a processing means. The benefit of comparing the code unit in the repeated pattern is that the reading errors of partial detection of a single code unit can be avoided. Further the method may comprise a step of validating the reading upon the result of the comparison. For example, the comparison step may require image or signal processing including a comparison of the captured images or received signal of the code units. The comparison may require AI algorithms to be stored in the device. For instance, the validation step may set a threshold of similarities of the captured images or received signals.

A third aspect of the invention relates to an aerosol generation device comprising an optical reading device configured to perform the method as described above.

The device may be configured to receive the article. The device may evaporate the tobacco material by heating the article in a heating chamber. The optical reading device may be a CCD camera or a photoemitter/detector. The reading device may be positioned in a fixed reference position relative to the heating chamber. The reading device may be arranged in the aerosol generating device in a position sufficiently remote from the code to form an image or allow reading of the code through optical means, possibly through a mirror transmission. The reading device may have two-dimensional photo-diodes capturing an area that may have a width and a height. The height may extend in a first, e.g. axial, direction of the article and the width may extend along a second, e.g. circumferential, direction of the article.

One example of a suitable reading device capable of reading two-dimensional dots of the code comprises a Sonix optical identification system including a SN9S102 image sensor (CMOS) module and an image decoder such as SN9p701. The camera module with the support of a driver operating system captures the code and the decoder converts the signal to the corresponding digital code.

Preferably, the reading system is configured to capture the information code and arranged such that at least one code unit is captured fully irrespective of the rotational and/axial position of the article in the heating chamber of the device.

Preferably, the reading system comprises a camera and the camera is configured to capture at least an area with twice the width and twice the height, preferably 3 times the width and 3 times the height, of one code unit. Thereby, it can be ensured that regardless of the rotational and/or axial position of the article a code unit can be read out.

The reading device may comprise a light emitter or source preferably a broadband LED, and a photodetector to detect the reflected light by the information code. In a simple system, a variation of the light intensity may be detected by the detector. The emitted light is reflected off of the surface and returned to the detector. The reflected light from the exposed surface shows a different intensity (less scattering and therefore higher intensity) from the light reflecting off. The emitter may be separated from the detector or receiver. The emitter can be a very simple light source which reflects off of the edges or bottoms of the engraved surfaces of the code. It does not have to be directed light. The emitter may emit ambient light, UV, infrared or directed light. For example, the light emitter can be a light-emitting diode or laser diode emitting an infrared light and more particularly a light with a wavelength of e.g. 380-900 nm.

In one example, a photodiode may be adapted to convert a received light beam into a current or voltage signal. The reading arrangement may comprise processing means including a printed circuit board embedding a processor, sensor signal amplifier, signal filters and circuitry for coupling the processing means to the light emitter, light receiver and to the control unit of the aerosol generating device. The output signal may be computed by measuring the intensity of the reflected beam over time. The output signal may be computed or generated by determining the variation over the time of the intensity of the reflected light beam.

In one example, the reading device comprises a camera or image sensor (e.g. CMOS) and an image decoder.

A fourth aspect of the invention relates to an aerosol generation system comprising an aerosol generation article as described herein and an aerosol generation device as described herein.

Figure 2:
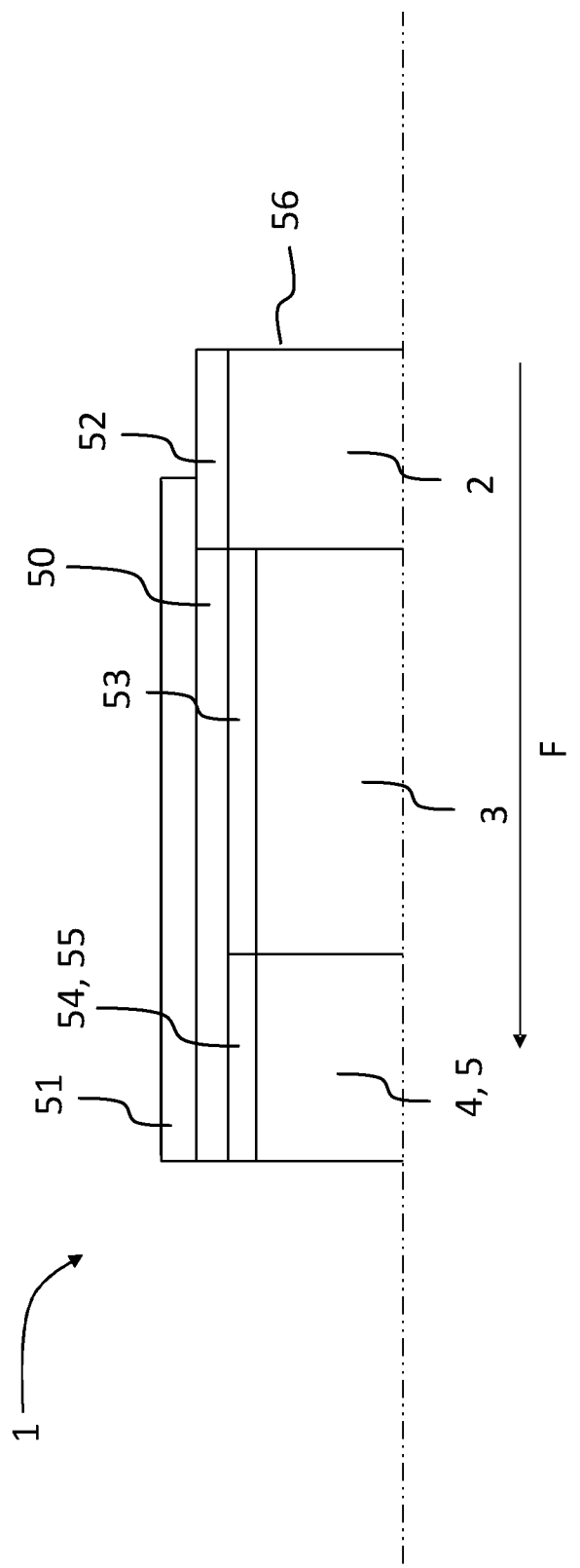
Figure 3:
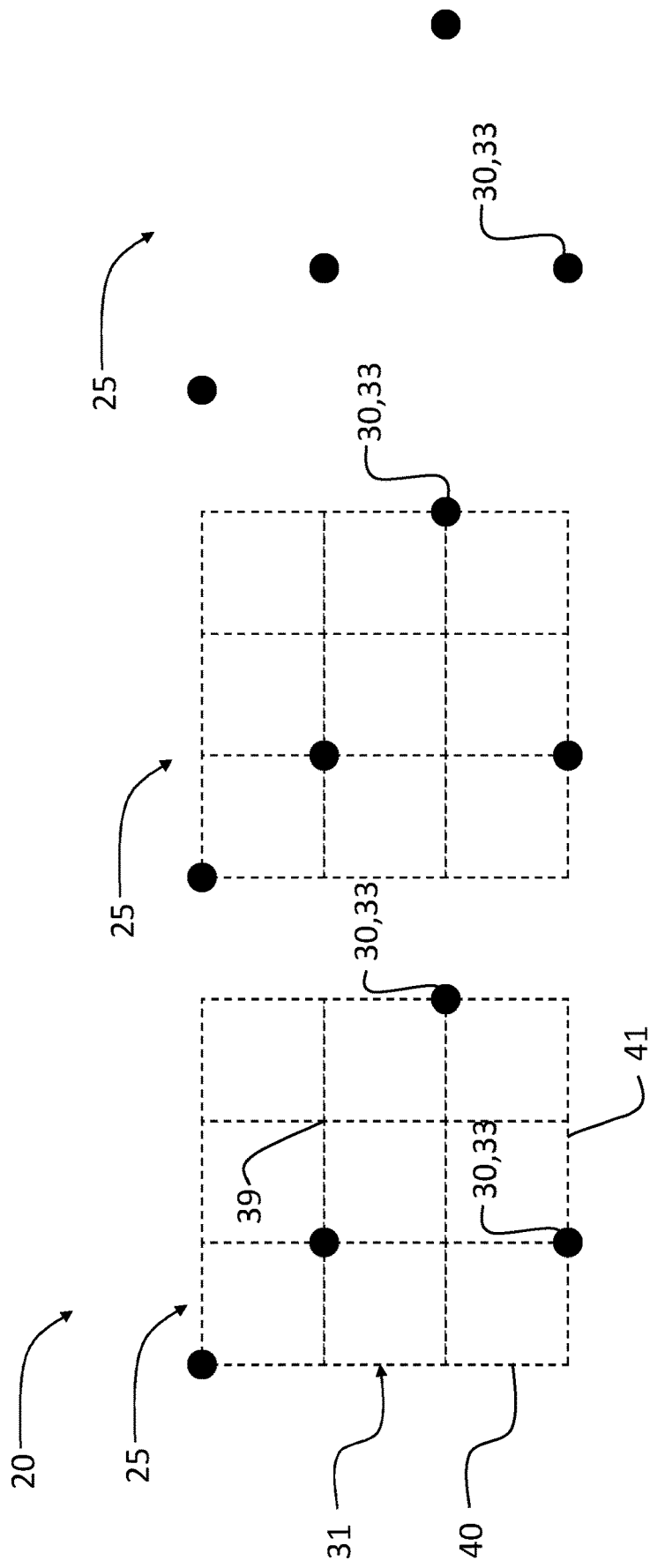
Figure 4:
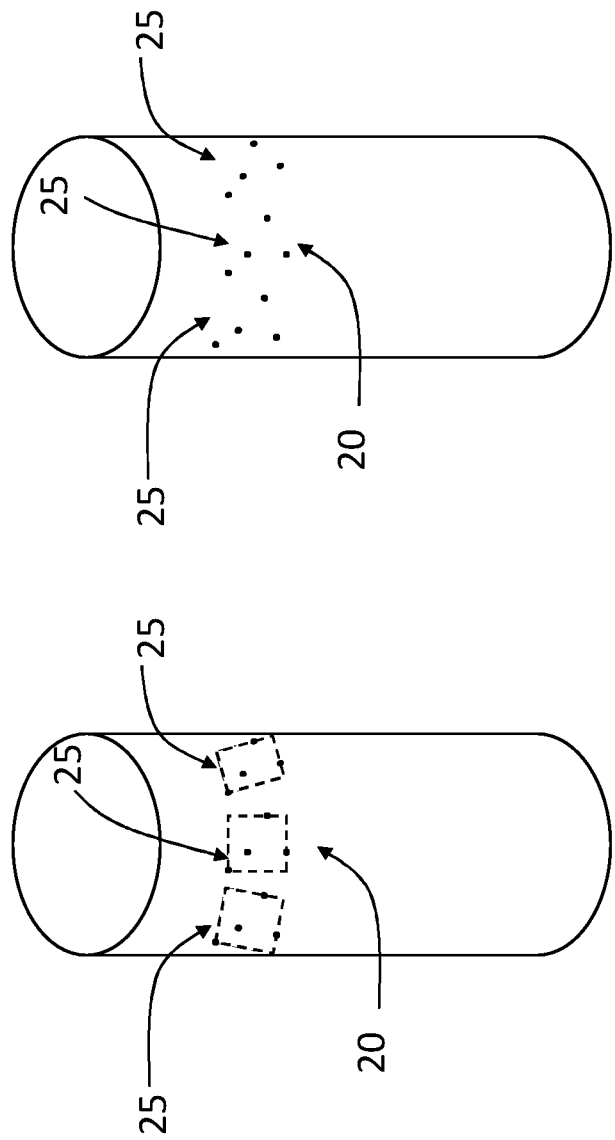
Figure 5:
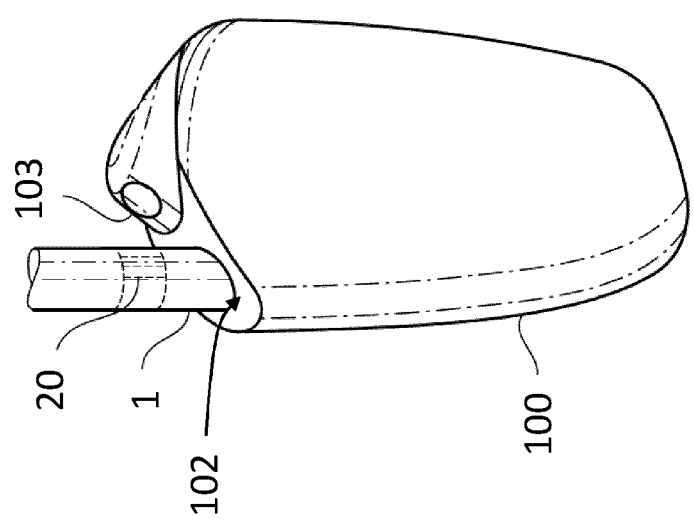
Figure 12B:
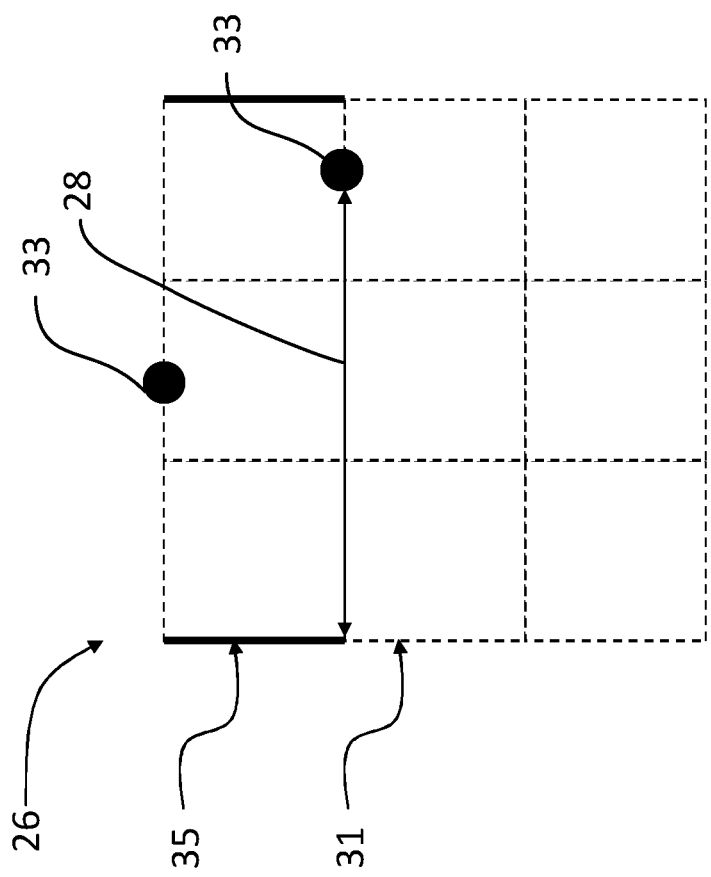
Figure 12A:
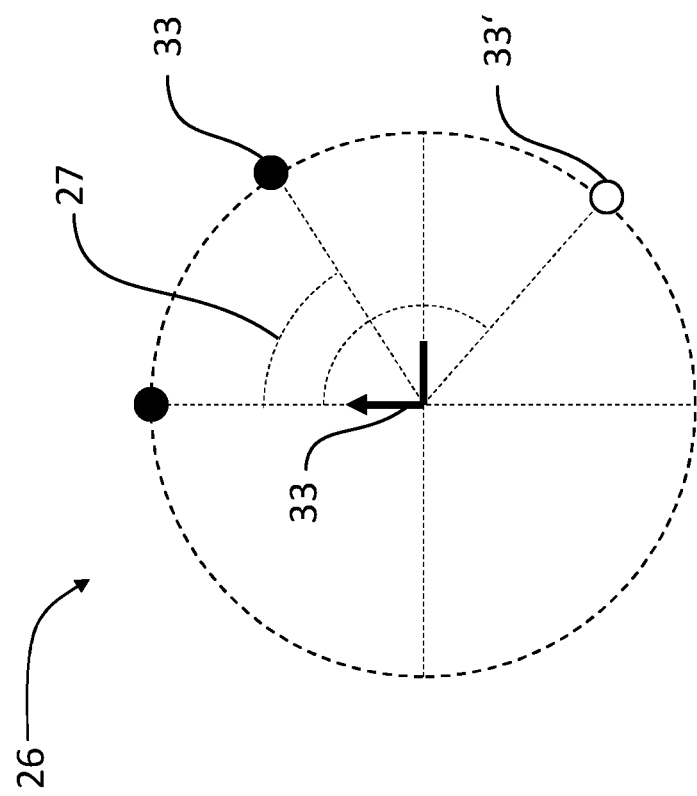

Non-limiting embodiments of the invention are described, by way of example only, with respect to the accompanying drawings, in which:

FIG. 1: shows a schematic drawing of an article for aerosol generation according to the invention, FIG. 2: shows a cross-section of the article according to FIG. 1, FIGS. 3A to 3C: shows a first embodiment of an information code including a code unit, FIG. 4: shows a schematic drawing of the article of FIG. 1 with the information code shown in FIG. 3, FIG. 5: shows a schematic drawing of the article in combination with an aerosol generation device, FIGS. 6A to 6C: show a first embodiment of a code unit including a pattern and a reference element, FIGS. 7A to 11C: show a second, third, fourth, fifth and sixth embodiments of a code unit including a pattern and a reference element, FIGS. 12A and 12B: show a code unit comprising an analog pattern, and FIG. 1 shows a schematic drawing of an aerosol generating article 1 for use with an aerosol generation device. The article 1 may be an aerosol forming stick with a circular cylindrical shape. The article 1 has an axial direction A and a circumferential direction C. The article 1 includes three sections.

The article 1 may comprise
- a first section 2 comprising a tobacco substrate such as a tobacco rod
- a second cooling section 3 that cools the aerosol comprising a paper tube and/or a filtering element, for example a hollow cellulose acetate tube,
- a third filter section 4, 5 comprising one or more filter segments such as a polymeric filament filter.

The third filter section may be formed, for instance of two segments such as a center hole filter segment or cavity segment 4 and an acetate filter segment 5 at the mouth end. The order of the filter or cavity segments starting from the mouth end can differ depending on the filter choice. The filter section can also be formed of a single filter segment such cellulose monoacetate filter segment. The third filter section 4, 5 is optional. In alternative embodiments the article 1 may comprise the first and second sections 2, 3 without additional one or more filter segments.

The sections 2 to 5 can be wrapped at least partially by an outer wrapper 50 (usually called "tipping paper") such that the components of the sections are held together in a single piece.

FIG. 2 shows a cross-section of the article 1 shown in FIG. 1 with the sections 2 to 5. As can be seen from FIG. 2, each section includes an individual inner wrapper (also called "plug wrap" for the filter segments and "tobacco paper" for the tobacco segment). For example, the tobacco substrate may comprise tobacco cut-filler and/or reconstituted tobacco sheets. The tobacco substrate may include an aerosol former such as glycerine and/or propylene glycol and/or 1.3 propanediol. The aerosol former may also have humectant type properties that help maintain a desirable level of moisture in the tobacco substrate when the substrate is composed of a tobacco-based product including tobacco particles. In particular, some aerosol formers are hygroscopic materials that function as a humectant, that is, a material that helps keep a substrate containing the humectant moist.

The tobacco substrate portion is wrapped in a first inner wrapper 52 ("tobacco paper"). The inner wrapper 52 may be made from or comprise a paper material and holds the tobacco material in a desired shape.

The second section 3 comprises a cooling tube element 53. The cooling tube element may comprise paper. Alternatively, it can be a hollow filtering element typically including a conventional filter material such as cellulose acetate and/or natural fibers. The fibers are also held together by a second inner wrapper (not shown). The third section 4, when present in the article 1 may be a corrugated sheet material or a hollow filter, for example of natural (e.g. cellulose fiber) or synthetic polymer (e.g. cellulose acetate) material that is held within a third inner wrapper 54. Lastly, the fourth section 5 at the mouth end may comprise a filter segment such as made of cellulose acetate or natural filter material (e.g. cellulose fiber) and as is known for conventional cigarettes. The mouth end filter is wrapped in a fourth wrapper 55. All inner wrappers 52 to 55 can be made from a paper or cellulose acetate material. The sections 3 to 5 are held together by the outer wrapper 50, preferably made from a paper material. The filter section may further comprise a flavoring component. The flavoring component may be formed by small particles, granules, compacted powder or one or more flavor-on-demand (e.g. crushable) capsules containing liquid flavoring ingredient. As is known, the capsule may be configured with a protective shell and a flavoring core to deliver flavor on demand such as upon applying an external force on the filter section to break the shell.

Additionally, the article 1 comprises a tipping paper 51. The tipping paper 51 is located over the whole filter sections 3-5 and partially over tobacco section 2 to hold it together with the filter sections 3-5. During use, the first section 2 is heated. A user draws from a mouth end 56 and his/her lips are in contact with the tipping paper 51. The tipping paper 51 may be perforated with ventilation holes and colored. Ventilation holes may further extend through the cooling tube element 53. During use, a user draws on the end of fourth section 5 (acetate filter) which causes an airflow F through the article 1 along its axial direction. Typically, the tobacco substrate in the first section 2 is heated, which volatizes components of the tobacco substrate, in particular volatile compounds of the tobacco material and aerosol formers. The volatized components become entrained in the airflow F and an aerosol is formed. Additional air further dilution of the volatized components may come from the ventilation holes if they are present. The aerosol is then transported through the article 1 to the user drawing at the mouth end 56.

Any of the inner wrappers 52 to 55, outer wrapper 50 or tipping paper 51 may be referred as a "wrapper" herein. According to the present invention, any one of the wrappers may comprise an information code comprising one or more code unit as will be described with regard to FIGS. 3A to 12B. In a further alternative, the article 1 may comprise an additional band on top of or in between the previously described wrappers 50 to 55. In case the information code is arranged on one of the inner wrappers 2 to 5 or a portion of the outer wrapper 50 that is covered by the tipping paper 51, it might be preferable to provide outer wrapper(s), i.e. tipping paper 51 and/or outer wrapper 50, being at least partially transparent at a code reading illumination wavelength.

FIGS. 3A to 12B disclose embodiments of information codes 20 that may be arranged on the previously described article 1. FIGS. 3A to 3C disclose an information code 20 with three code units 25. The code unit 25 shown in FIG. 3A includes a pattern 30 with dots 33, that are arranged along a grid 31. The pattern may represent a particular type of consumable for example a particular tobacco blend and/or tobacco flavor. The grid 31 is formed by a 3 by 3, matrix of parallel lines (any other n by n size may also be suitable, i.e. 4 by 4, 5 by 5, etc.). The grid may be formed by a set of first lines that may be arranged parallel to each other and may be arranged equidistant to the neighboring parallel grid lines 39. Further as e.g. shown in FIGS. 3A to 3C, the grid comprises a second set of parallel grid lines 40 that may be arranged parallel to each other and may be arranged equidistant to the next parallel grid lines 41. The first and second set of lines may be orthogonal to each other.

The dots 33 may be arranged at each intersection 39 of the grid. Thus, there are 16 potential positions for dots. In this embodiment, information is stored through the pattern 30 of the dots 33 on intersections 39 of the grid lines. Each intersection 39 may comprise a dot 33 ("1" or alternatively "0") or no dot ("0" or alternatively "1"). Hence, the pattern in the top vertical grid line shown in FIG. 3A includes the code "1000". The second line includes the code "0100", the third line includes the code 0001 and the fourth line includes the code "0100". Such a pattern allows for $2^{16}$ (65,536) combinations. It should be noted that the grid (shown as dotted lines in FIGS. 3A and 3B) may or may not be arranged on the wrapper. Preferably, the grid 36 is not arranged on the wrapper as shown in FIG. 3C. Thereby, a simple yet easy and quick to read binary code is provided.

The dots (and optionally the grid) may be printed, e.g. with ink, on one of the wrappers 50 to 55. It should be noted that the information code 25 may be optically recognizable, i.e. such that a user could read out the information on the article 1 prior to inserting the article 1 into the device. For example, the first line of code ("1000") may indicate that the tobacco is an American blend.

When an article 1 is inserted into the aerosol generation device 100, the information code 20 is read out. However, a code 20 only comprising a single code unit 25 may not be aligned with the reading device in case the article is not inserted in the fitting rotational position. Therefore, the code unit 25 may be repeated one or more times around the circumferential direction C of the article 1. Thus, an article may comprise three code units 25 next to each other as shown for example in FIGS. 3A to 3C. In particular, there are at least four code units 25 (i.e. three repetitions) around the circumference. In further embodiments there may be 4 or more repetitions. It should be noted that the repetitions may be identical.

An example with five repetitions (6 code units) is shown in FIGS. 4A and 4B. FIG. 4A shows (for illustration purposes) the grid 31 and the dots 33. In FIG. 4B only the dots 33 are shown. In case the reading device is capable of reading a sector comprising at least 120° (i.e. twice the width of a single code unit), then the code can be read out regardless of the rotational position of the article 1 when inserted in the heating chamber 102 of the aerosol generation device 100 (see FIG. 5). In some embodiments, the reading device 103 (see FIG. 5) of the aerosol generation device 100 may be capable of reading out a sector comprising 3 times the circumferential width of a code unit 25. In this case, the readable sector comprises 2 code units. Further the reading device 103 (see FIG. 5) may be capable of reading out a height comprising at least two times, preferable three times the axial height of a code unit 25.

However, in particular in the case of rotational positions where the code unit is arranged at a border of the readable sector of the reading device, errors may occur. The article 1 may have a high curvature resulting in misreads of the provided code. Therefore, it is preferred that the code 20 comprises at least 3, 4, 6, 8, 10 or more code units 25 along the circumferential direction. Thereby, the readable sector may be reduced to 90° (8 code units) or less resulting in simpler reading units and less image reconstruction errors.

An example of the aerosol generation device 100 is shown in FIG. 5. The aerosol generation device 100 includes a heating chamber 102 in which the article 1 can be inserted and heated to generate an aerosol. Additionally, the device 100 includes the reading device 103 that is arranged to read the code 20 on the article 1. In the shown embodiment, the reading device 103 is arranged at an end of an opening of the heating chamber 102. The aerosol generation device 100 has a case, wherein the case includes an opening for the reading device such that the information code 20 can be optically recognized. In FIG. 5 the article 1 is fully inserted. In the fully inserted position, the code 20 is outside of the heating chamber 102 and can be read by the reading device 103.

It should be noted that the patterns 30 are enlarged in FIGS. 4A to 5 for illustration purposes. A code unit 25 may have a height (i.e. extension along the axial direction A of the article) of 10 mm, 8 mm, 5 mm, 2 mm, 1 mm, 0.5 mm, 0.3 mm or less. The width of the code unit (i.e. extension along the circumferential direction C) may be 10 mm, 8 mm, 5 mm, 2 mm, 1 mm, 0.5 mm, 0.3 mm or less.

In addition to the pattern 30 of the dots 33 shown in FIGS. 3A to 3C, the information code 25 may comprise a reference element 35. The reference element 35 may comprise a series of dots 36 that are arranged at intersections of the grid 31. One example of such a reference element is shown in FIGS. 6A to 6 C. The dots of the reference element 35 are shown as empty circles while the dots 33 of the pattern 30 are shown as filled circles. The dots of the pattern 30 and the reference element 35 may be identifiable by being e.g. printed as filled and empty circles. Preferably however, the pattern and the reference element may have different colors. For example, the pattern 30 could be printed in black while the reference element 35 is printed in blue or green or red.

In advance, the aerosol generation device 100 does not know the information that is contained in the pattern 30. Hence, it may be difficult to identify the presence/the position of the pattern 30 and to differentiate between patterns that are arranged directly next to each other. The reference element 35 helps the reading device to identify the position of the pattern 30. Each code unit may comprise its own reference element. The reference element 35 is printed for every pattern at the same position.

This is shown for example in FIGS. 6A and 6B. In FIG. 6A, the pattern includes a code ("001, 110, 010, 100") and a reference element in each line of the grid. In FIG. 6B, a different code ("100, 010, 001, 010") is shown, but the reference element 35 is the same. The reference element thus provides the reading device with the proper position of the pattern and enables the reading device to read out the pattern in relation to the position of the reference element.

An alternative reference element is shown in FIGS. 7A to 7C. Instead of a dot 36 the reference element 35 is represented by lines 37. The lines 37 may frame the pattern 30, i.e. the dots 33. However, since the reference element 35 is invariable for all patterns, the reference element may also be in any position relatively to the pattern 30. Though FIGS. 7A to 7C show lines that are arranged along the grid 31, the reference element 35 may have any position as long as the position of the reference element 35 in relation to the pattern 33 is identical for each code unit. It is preferred that the reference element 35 and the pattern 30 partially overlap or, particularly preferred, that the pattern has at least the same size as the reference element. Thereby, more information can be stored in a single code unit 25. Further, it is preferred that the reference element 35 and the pattern 30 are made up of different geometrical elements and/or colors as for example shown in FIGS. 7A to 7C as compared to FIGS. 6A to 6C. Thereby, the amount of information that can be stored in the pattern is not reduced by the reference element. Instead of lines 33, the reference may also be formed of dots, such as three dots including a central dot and two dots on different radial lines e.g. oriented at 90° from each other. Instead a central dot, all dots may be on different radial lines.

In the embodiment shown in FIGS. 7A to 7C, the reference element 35 is formed by 3 lines, that delimit the border of the grid 31. The 3 lines are arranged along 3 of the 4 borders of the grid 31. Additionally, the fourth border can be determined from the endpoint of the line in the lower left corner of the grid. Hence, a user could identify the pattern, in particular if the pattern is repeated along a circumferential direction, without any difficulty. Thereby, the encoded pattern can be identified even without a reading device. In other examples, the lines 37 of the reference element 35 may full encircle (i.e. form a closed rectangle) around the pattern 30. However, the reference elements 35 may also be placed at the center of the pattern in alternative embodiments.

Figure 8A:
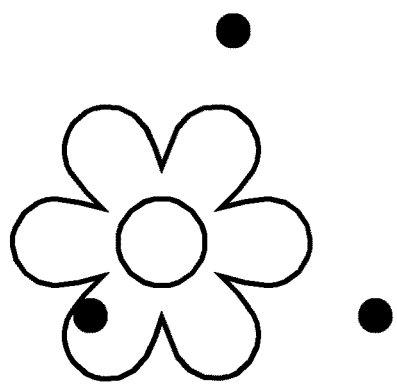
Figure 8B:
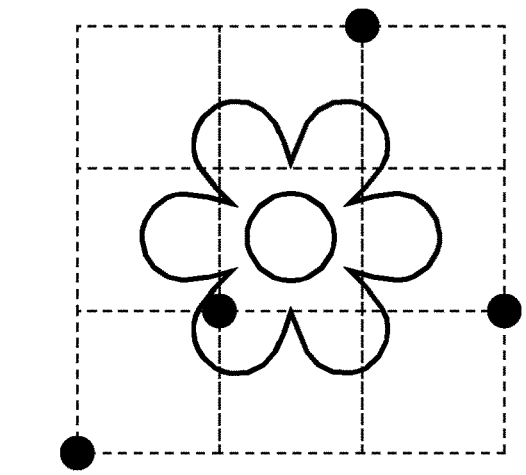
Figure 8C:
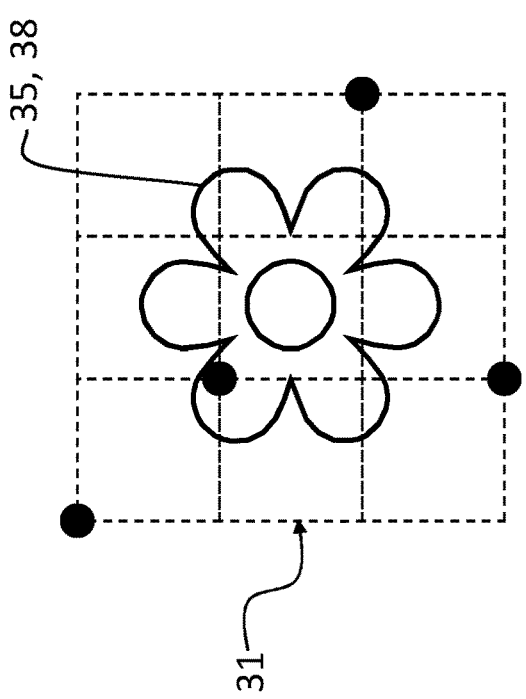

A further reference element is shown in FIGS. 8A to 8C. The reference element 35 is formed by a picture 38, here the picture of a flower. The picture is arranged at the center of each code unit 25, i.e. at the center of the grid 31. In this example, the reference element or picture may be a watermark in the wrapper. The pattern or dots may be ink printed on the (e.g. outer) surface of the wrapper.

Figure 9A:
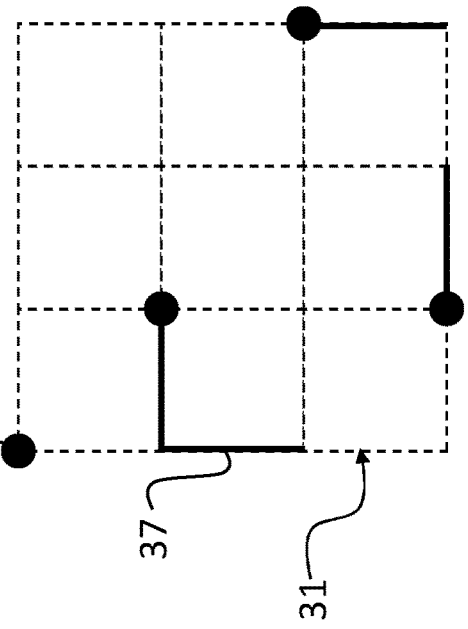
Figure 9B:
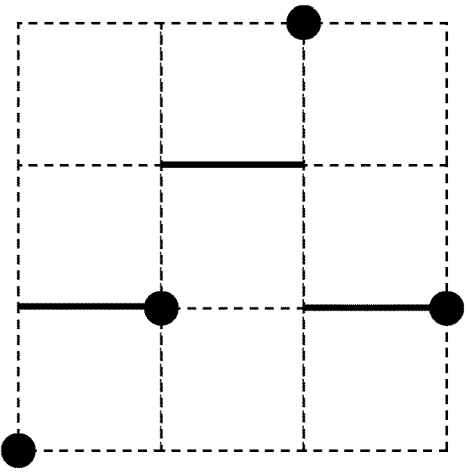
Figure 9C:
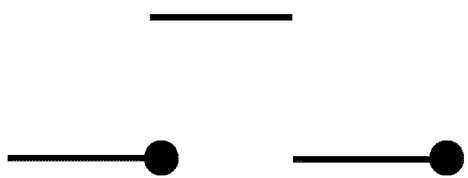

FIGS. 9A to 9C disclose a further variation of the information code 20. In the embodiment of FIGS. 9A to 9C the reference element 35 is formed by dots 36, while the encoded pattern 30 is formed by lines 33.

FIGS. 10A to 10C disclose another variation of the information code. In this embodiment, both, the reference element and the pattern 30 are formed by lines. The reference element 35 is formed by dashed lines 37, while the pattern 30 is formed by continuous lines 34.

FIGS. 11A to 11C show a further embodiment of an information code 20 with different code units 25. Here the pattern 30 comprising a series of dots 33 is arranged along the circumference of a circle 42. The circle is portioned in sectors of, preferably equal length and each sector may or may not comprise a dot. Thereby, information may be encoded. For example, the code in FIG. 11A reads (in the clockwise direction, starting at 12 o'clock) "11101000". The pattern 30 may be arranged along multiple circles. One example is shown in FIGS. 11B and 11C. Additionally to the outer circle, FIG. 11B shows a second inner circle 43 along which further dots 33 may be arranged. Here, the inner circle reads "00000010".

Further, the embodiment shown in FIGS. 11A to 11C also comprise a reference element 35. The reference element 35 includes two lines 37. The lines are arranged at the center of the circle(s) of the pattern 30. Thereby, the reading device can identify the center position of the circles. Further, the orientation of the lines 37 may indicate a starting position of the code. As can be seen from FIGS. 11A to 11C, the horizontal line of the reference element 35 indicates the position at 12 o'clock, at which the code may start. For example, a dot may be aligned with one of the lines 37 to form the start dot and the code may be read in a clockwise direction (or in a counter clockwise direction).

FIGS. 12A and 12B further disclose an encoding technique for analog information. Analog information may in particular relate to continuous variable such as temperature and/or time. For example, the temperature may be a heating temperature and the time may be for controlling a particular event of a heating profile optimized for the identified article. Similarly to the embodiment in FIGS. 11A to 11C, the pattern 30 is arranged along the circumference of a circle. However, the dots 33 of the pattern 30 are not arranged in predetermined positions. Rather, the dots 33 may be arranged at any point along the circumference. Their precise angular position 27 in relation to a reference point (e.g. 12 o'clock) presents an analog value. The reference point may be indicated by the reference element, in particular by an indicator such as the arrow shown in FIG. 12A. For example, the angle 60° indicated by the dot 33 may indicate a temperature of 310° C.

Further, the pattern 30 represent multiple variables in a single circle. Here, the circle includes a second dot 33' (empty circle) that may e.g. represent a time during which the heating stick is heated to a set temperature (e.g. 1 min).

An alternative representation of analog information is shown in FIG. 12B. Here the dots 33 are arranged along horizontal (or vertical) lines of the grid 31 shown e.g. in FIGS. 3A to 3C. The distance 28 to a reference element, e.g. reference element 35 or a predetermined position relative to the reference element, determines the analog value. Several concentrically arranged circles having a common reference 33 may be provided to receive dots for encoding different parameters. For example, an outermost circle may encode heater temperatures whereas an inner circle may encode time values.

The invention claimed is:

1. An article for an aerosol generation device, comprising:
a tobacco material configured to generate an aerosol and a wrapper, the wrapper including an optically recognizable information code for storing information on the article, the information code including a code unit having a pattern which codes the information, the code unit being repeated on the article,
wherein the article comprises a circumference and at least one circumferential area, wherein the code unit is repeated along the circumference of the circumferential area,
wherein the code unit includes a reference element for indicating the presence and the position of the pattern to an optical reading device of the pattern, and
the reference elements have a first color and the pattern has a second color, the second color being different from the first color.

2. The article according to claim 1, wherein the reference element includes a picture, dots, lines, or any combination thereof.

3. The article according to claim 1, wherein the reference element includes two or more lines which form at least a part of a border of the code unit.

4. The article according to claim 1, wherein the reference element is at least partially superimposed by the pattern.

5. The article according to claim 1, wherein the code units of the information code are arranged in a tessellating shape.

6. The article according to claim 1, wherein the article comprises a first part and a second part, wherein the first part does not comprise the tobacco material, and wherein the information code is located on the first part.

7. The article according to claim 1, wherein the pattern represents a binary code, wherein the pattern includes a plurality of individual elements, each of the elements being a dot and/or a line, the individual elements being positioned in predetermined positions of the pattern, wherein the presence or absence of an individual element in a predetermined position represents binary information.

8. The article according to claim 7, wherein the predetermined positions of the individual elements are arranged according to a regular grid defined by grid lines.

9. The article according to claim 8, wherein the individual elements comprise lines arranged between intersections of the grid lines and/or the dots arranged at intersections of the grid lines.

10. The article according to claim 8, wherein the grid is formed of abscise and ordinate lines crossing at 90° or is formed of a circle crossed by a plurality of radial lines.

11. The article according to claim 10, wherein the predetermined positions of the individual elements are arranged along a circle or a plurality of concentrically arranged circles.

12. The article according to claim 7, wherein the predetermined positions of the individual elements are arranged along a band.

13. The article according to claim 1, wherein the pattern includes an analog code.

14. The article according to claim 1, wherein the pattern includes one or more individual elements, each of the elements being a dot and/or a line, the one or more individual elements being positioned along a predetermined distance or in a predetermined area, wherein the position of an individual element along the distance or in the area represents information.

15. The article according to claim 14, wherein the individual elements are arranged according to a regular grid defined by grid lines.

16. The article according to claim 15, wherein the grid is formed of abscise and ordinate lines crossing at 90° or is formed of a circle crossed by a plurality of radial lines.

17. The article according to claim 16, wherein the predetermined range or area of the individual elements is arranged along at least one circle or a plurality of concentrically arranged circles.

18. The article according to claim 14, wherein the individual elements comprise lines arranged between intersections of the grid lines and/or the dots arranged at intersections of the grid lines.

19. The article according to claim 14, wherein the predetermined range or area of the individual elements is arranged along a band.

20. The article according to claim 1, wherein the article comprises an outer wrapper covering the wrapper having the information code at least partially and wherein the outer wrapper is at least partially transparent or translucent such that the information code can be detected with visible light.

21. The article according to claim 1, wherein the pattern and/or reference element comprises a plurality of individual elements, wherein at least some of the plurality of individual elements have a length and/or width of less than 100 μm.

22. The article according to claim 1, wherein the reference element includes a decorative image that does not itself code the information.

* * * * *